United States Patent
Lima

(10) Patent No.: US 11,820,659 B2
(45) Date of Patent: Nov. 21, 2023

(54) FILMS OF MULTIWALL, FEW WALL, AND SINGLE WALL CARBON NANOTUBE MIXTURES

(71) Applicant: LINTEC OF AMERICA, INC., Richardson, TX (US)

(72) Inventor: Marcio D. Lima, Richardson, TX (US)

(73) Assignee: LINTEC OF AMERICA, INC., Plano, TX (US)

( * ) Notice: Subject to any disclaimer, the term of this patent is extended or adjusted under 35 U.S.C. 154(b) by 78 days.

(21) Appl. No.: 17/605,753

(22) PCT Filed: May 26, 2020

(86) PCT No.: PCT/US2020/034590
§ 371 (c)(1),
(2) Date: Oct. 22, 2021

(87) PCT Pub. No.: WO2020/243112
PCT Pub. Date: Dec. 3, 2020

(65) Prior Publication Data
US 2022/0144641 A1     May 12, 2022

Related U.S. Application Data

(60) Provisional application No. 62/976,449, filed on Feb. 14, 2020, provisional application No. 62/855,432, filed on May 31, 2019.

(51) Int. Cl.
*C01B 32/158*     (2017.01)
*C01B 32/159*     (2017.01)
(Continued)

(52) U.S. Cl.
CPC .............. *C01B 32/158* (2017.08); *B32B 5/12* (2013.01); *B32B 7/022* (2019.01); *C01B 32/159* (2017.08);
(Continued)

(58) Field of Classification Search
CPC .............. C01B 32/158; C01B 2202/02; C01B 2202/04; C01B 2202/06; C01B 2202/34;
(Continued)

(56) References Cited

U.S. PATENT DOCUMENTS 7,428,402 B2    9/2008    Hays et al.
8,460,547 B2    6/2013    Sun et al.
(Continued)

FOREIGN PATENT DOCUMENTS

JP     2009-515812     4/2009
JP     2016-190772     11/2016
(Continued)

OTHER PUBLICATIONS

Notice of Allowance dated Aug. 2, 2022 issued in Taiwanese patent application No. 109117525, along with a corresponding English translation.
(Continued)

*Primary Examiner* — Jasper Saberi
(74) *Attorney, Agent, or Firm* — GREENBLUM & BERNSTEIN, P.L.C.

(57) ABSTRACT

Nanofiber membranes are described that include multiple layers of nanofiber structures, where each structure is a composite composition of multiwall carbon nanotubes and one or both of single wall and/or few walled carbon nanotubes. By selecting the relative proportions of multiwall and one or more of single/few wall carbon nanotubes in a nanofiber film, the membrane can be fabricated to withstand the heating that occurs during operation in an EUV lithography machine, while also having enough mechanical integrity to withstand pressure changes of between 1 atmosphere (atm) and 2 atm between operating cycles of an EUV lithography machine.

19 Claims, 9 Drawing Sheets

(51) Int. Cl.
  *B32B 7/022* (2019.01)
  *B32B 5/12* (2006.01)
  *B82Y 30/00* (2011.01)

(52) U.S. Cl.
  CPC ..... *B32B 2250/20* (2013.01); *B32B 2262/106* (2013.01); *B32B 2307/732* (2013.01); *B82Y 30/00* (2013.01); *C01B 2202/02* (2013.01); *C01B 2202/04* (2013.01); *C01B 2202/06* (2013.01); *C01B 2202/08* (2013.01); *C01B 2202/34* (2013.01); *C01B 2202/36* (2013.01); *C01P 2004/03* (2013.01)

(58) Field of Classification Search
  CPC .. C01B 32/159; B32B 2262/106; B82Y 30/00
  See application file for complete search history.

(56) References Cited

U.S. PATENT DOCUMENTS

| | | | |
|---|---|---|---|
| 2008/0280115 A1* | 11/2008 | Liang | B82Y 30/00 428/323 |
| 2010/0159222 A1* | 6/2010 | Hata | C01B 32/162 428/218 |
| 2011/0220574 A1 | 9/2011 | Bakajin et al. | |
| 2012/0000293 A1* | 1/2012 | Baughman | H02N 11/006 359/566 |
| 2013/0216922 A1* | 8/2013 | Zheng | H01M 12/08 429/405 |
| 2014/0113127 A1 | 4/2014 | Tominaga et al. | |
| 2014/0202953 A1 | 7/2014 | Choi et al. | |
| 2016/0152757 A1 | 6/2016 | Wang et al. | |
| 2018/0329289 A1* | 11/2018 | Gallagher | G03F 1/22 |

FOREIGN PATENT DOCUMENTS

| | | |
|---|---|---|
| WO | 2007/015710 | 2/2007 |
| WO | 2013/133941 | 9/2013 |
| WO | 2018/229765 | 12/2018 |
| WO | 2019/099299 | 5/2019 |

OTHER PUBLICATIONS

Fujisawa, K. et al., "A Review of Double-Walled and Triple-Walled Carbon Nanotube Synthesis and Applications", *Appl. Sci.* vol. 6, Issue 109, 39 pages (Apr. 16, 2016).

International Search Report issued in PCT/US2020/34590, dated Aug. 27, 2020.

Written Opinion of the ISA issued in PCT/US2020/34590, dated Aug. 27, 2020.

Office Action issued in Taiwanese Counterpart Patent Appl. No. 109117525, dated Nov. 3, 2021 and corresponding English translation.

Office Action dated Apr. 27, 2023 issued in Korean Patent Application No. 10-2021-7030576 along with corresponding English translation.

Japanese Office Action dated Jun. 6, 2023 issued in Japanese patent application No. 2021-568400 along with corresponding English translation.

* cited by examiner

Nanofiber forest

Example reactor for growing nanofibers

FILMS OF MULTIWALL, FEW WALL, AND SINGLE WALL CARBON NANOTUBE MIXTURES

RELATED APPLICATIONS

This application claims priority under 35 USC § 119(e) to U.S. Provisional Patent Application No. 62/855,432 entitled "FILMS OF MULTIWALL, FEW WALL, AND SINGLE WALL CARBON NANOTUBE MIXTURES," filed on May 31, 2019, and U.S. Provisional Patent Application No. 62/976,449 entitled "FILMS OF MULTIWALL, FEW WALL, AND SINGLE WALL CARBON NANOTUBE MIXTURES," filed on Feb. 14, 2020, both of which are incorporated by reference herein in their entirety.

TECHNICAL FIELD

The present disclosure relates generally to carbon nanofibers. Specifically, the present disclosure relates to films formed from a mixture of multiwall carbon nanofibers and one or more of few wall and single wall carbon nanotubes.

BACKGROUND

Nanofibers are known to have unusual mechanical, optical, and electronic properties. However, devising configurations of nanofibers that can be integrated into commercial products has been challenging because of the nanoscale dimensions of the nanofibers. PCT Publication No. WO 2007/015710 is one example of an advance in developing commercially useful embodiments of nanofibers. This publication describes converting a nanofiber "forest" into a nanofiber sheet and/or yarn. The nanofiber sheets and yarns may then be applied in a variety of contexts.

SUMMARY

Example 1 is a nanofiber membrane comprising: a first layer of carbon nanofibers comprising from 50 weight percent to 80 weight percent multiwall carbon nanofibers and from 20 weight percent to 50 weight percent single wall or few walled carbon nanofibers, so as to total 100 weight percent.

Example 2 includes the subject matter of Example 1 and a second layer of carbon nanofibers comprising from 50 weight percent to 80 weight percent multiwall carbon nanofibers and from 20 weight percent to 50 weight percent single wall or few walled carbon nanofibers, so as to total 100 weight percent; and a third layer of carbon nanofibers between the first layer and the second layer, the third layer comprising more 50 weight percent or more of single wall and/or few walled carbon nanofibers and less than 50 weight percent multiwall carbon nanofibers, so as to total 100 weight percent.

Example 3 includes the subject matter of Example 2, wherein: the multiwall carbon nanofibers comprise from 4 walls to 20 walls; the few wall carbon nanofibers comprise 2 walls and/or 3 walls; and the single wall carbon nanofibers comprise 1 wall.

Example 4 includes the subject matter of either one of Examples 1 or 2, wherein: the multiwall carbon nanofibers comprise a cross-sectional diameter of from 6 nm to 100 nm and a length of from 250 μm to 400 μm; the few wall carbon nanofibers comprise a cross-sectional diameter of from 2 nm to 6 nm and a length of from 0.5 μm to 30 μm; and the single wall carbon nanofibers comprise a cross-sectional diameter of 0.2 nm to 2 nm and a length of from 0.5 μm to 30 μm.

Example 5 includes the subject matter of any of the preceding Examples, wherein the first layer, the second layer, and the third layer, comprise randomly oriented and randomly distributed multiwall, few wall, and single wall carbon nanofibers.

Example 6 includes the subject matter of any of the preceding Examples, wherein an exposed surface comprises one of the first layer or the second layer comprising a majority of multiwalled carbon nanofibers.

Example 7 includes the subject matter of any of the preceding Examples, wherein a first exposed surface comprises a nanofiber film that includes a majority of multiwalled carbon nanofibers and a second exposed surface comprises a nanofiber film that includes the majority of few wall and/or single wall carbon nanofibers.

Example 8 includes the subject matter of any of the preceding Examples, further comprising a frame in contact with a peripheral edge of the third layer of carbon nanofibers, and not in contact with a freestanding portion of the third layer.

Example 9 includes the subject matter of any of the preceding Examples, further comprising a fourth layer of carbon nanofibers between the frame and the third layer, the fourth layer comprising a majority of few wall and single wall carbon nanofibers.

Example 10 includes the subject matter of any of the preceding Examples wherein one or more of the layers of carbon nanofibers comprises a film.

Example 11 includes the subject matter of any of the preceding Examples wherein at least one of the layers is uniform having a variation of thickness across its diameter of less than 50%.

Example 12 includes the subject matter of any of the preceding Examples wherein at least one of the layers or the membrane is non-uniform having a thickness that varies by greater than 10%.

Example 13 includes the subject matter of any of the preceding Examples wherein at least one of the layers has a first region and a second region and the first region has a first areal density of nanofibers that is at least twice as great as a second areal density of nanofibers in the second region.

Example 14 includes the subject matter of Example 13 wherein the first region is at a margin of the membrane.

Example 15 is a pellicle that includes the subject matter of any of the preceding Examples and exhibits a transmittance of radiation having a wavelength of 550 nm that is greater than 85%.

Example 16 is a nanofiber membrane comprising: a first layer of carbon nanofibers comprising a sheet of multiwall carbon nanofibers aligned in a plane of the sheet; and a second layer of carbon nanofibers comprising from 50 weight percent to 80 weight percent multiwall carbon nanofibers and from 20 weight percent to 50 weight percent single wall or few walled carbon nanofibers, so as to total 100 weight percent.

Example 17 includes the subject matter of Example 10, further comprising a third layer of carbon nanofibers on a side of the second layer opposite the first layer, the third layer comprising one of: a layer comprising more than 50 weight percent single wall or few walled carbon nanofibers; and another a sheet of multiwall carbon nanofiber aligned in a plane of the sheet.

Figure 1:
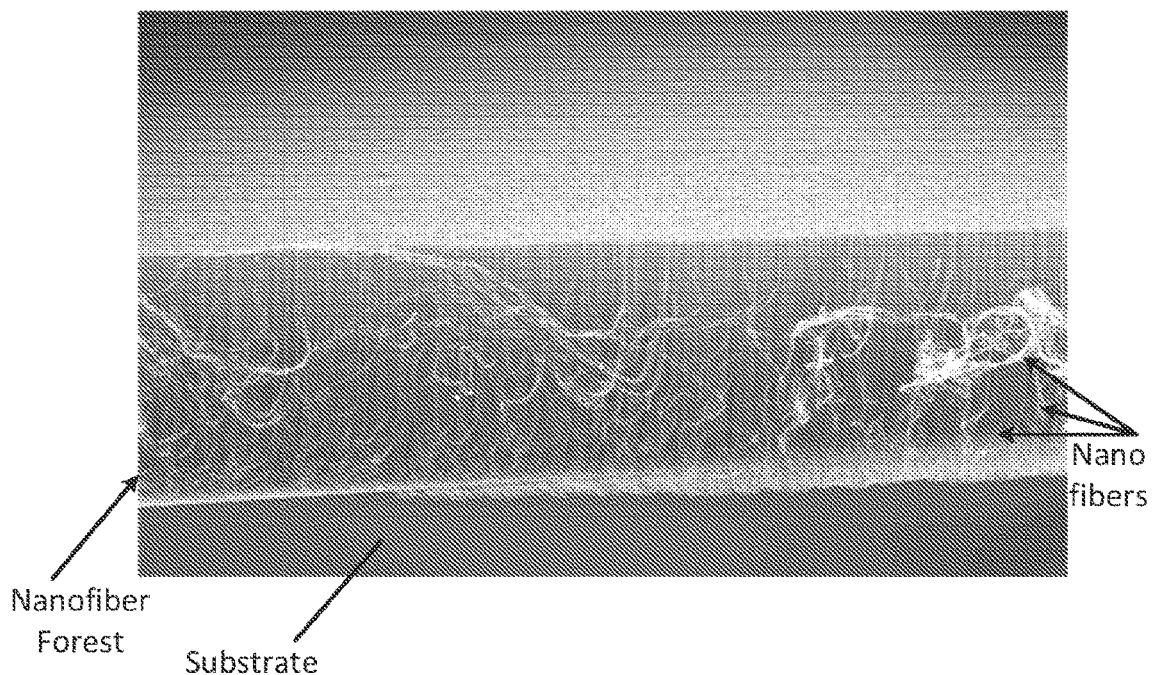
FIG. 1 is a photomicrograph of an example forest of nanofibers on a substrate, in an embodiment.

The figures depict various embodiments of the present disclosure for purposes of illustration only. Numerous variations, configurations, and other embodiments will be apparent from the following detailed discussion.

DETAILED DESCRIPTION

Overview

Carbon nanofiber structures are generally formed from one of multiwall carbon nanotubes (MWCNT), few wall carbon nanotubes (FWCNT), or single wall carbon nanotubes (SWCNT), but generally not combinations thereof. In some cases this is because many development efforts to date have been focused on forming pure (e.g., greater than 90%) forms of one type of carbon nanotube so that the properties of that type of nanofiber can be understood and optimized. Furthermore, the processes used to form pure forms of multiwall carbon nanotubes (e.g., carbon nanotubes having from 4 to 20 concentric walls and a diameter of from 4 nm to 100 nm), few wall carbon nanotubes (e.g., carbon nanotubes having two or three concentric walls and a diameter of from 2 nm to 6 nm), and single wall carbon nanotubes (e.g., 1 wall and a tube diameter of from 0.2 nm to 4 nm) can differ from one another. For example, while multiwall carbon nanotubes can be fabricated using a chemical vapor deposition process on a relatively thick layer of catalyst (e.g., from 10 nm to several microns thick) on a substrate, few and single wall carbon nanofibers are often formed using laser ablation, carbon arc processes, or chemical vapor deposition (using e.g., acetylene, ethane as precursor) on a layer of catalyst that is thin (e.g., 0.2 nm to 10 nm thick) and which may be discontinuous across the substrate. Laser ablation generally produces shorter carbon nanotubes than those produced by chemical vapor deposition and may produce nanotubes with fewer crystallographic defects. For at least this reason, generally the processes used to produce one type of nanofiber do not produce measurable amounts of the other types of nanofibers.

Each of these three different types of carbon nanotubes has different properties. In one example, few wall carbon nanotubes and single wall carbon nanotubes can be more conveniently dispersed in a solvent (i.e., with the majority of nanotubes suspended individually and not adsorbed onto other nanotubes) for subsequent formation into a sheet of randomly oriented carbon nanotubes. This ability of individual nanotubes to be uniformly dispersed in a solvent can in turn produce a dimensionally uniform nanotube film formed by removing the solvent from the suspended nanofibers. This configuration of nanofiber sheet is sometimes referred to as a "filtered film." This physical uniformity (further improved by stacking multiple filtered films on one another) can also improve the uniformity of the properties across the film (e.g., transparency to radiation).

The strength of van der Waals attraction between nanofibers also differs between single/few wall nanofibers and multiwall nanofibers. Generally, single/few wall nanofibers have a greater van der Waals attraction to each other than that observed for multiwall nanofibers. This increased attraction between single/few wall nanofibers can improve the ability of few/single wall carbon nanotubes to adhere to one another to form a coherent nanofiber structure, such as a filtered film. The sheets or films formed from single wall carbon nanotubes and few wall carbon nanotubes are able to conform to a topography of an underlying surface at smaller dimensions than sheets or films formed from multiwall carbon nanotubes. In some examples, sheets or films formed from single wall carbon nanotubes and/or few wall carbon nanotubes can conform to a topography of an underlying substrate as small as 10 nm, which is at least 50% smaller than the feature size a multiwall carbon nanotube film can conform to. In some cases, the multiwall carbon nanotubes are more likely than single/few wall nanotubes to agglomerate together and thereby produce a structurally non-uniform film that is less likely to conform and/or adhere to an underlying surface.

Filtered films, particularly those made with single and/or few wall carbon nanotubes also generally have greater transparency to some wavelengths of radiation. In some examples, transmittance of incident radiation can be as high as 90% or 95%. In some cases, this transmittance is significantly higher than drawn sheets of multiwall carbon nanotubes (such as those drawn from a carbon nanotube forest, described below). While not wishing to be bound by theory, it is believed that the aligned orientation of nanotubes in a drawn sheet increases scattering of the radiation relative to a filtered film. In part, the greater transparency of filtered films (with their randomly oriented nanotubes) has prompted interest in forming transparent filters and membranes from filtered carbon nanotube films in a variety of applications.

Despite the advantages of single wall carbon nanotubes and few wall carbon nanotubes described above, multiwall carbon nanotubes also have advantages not necessarily observed to the same degree in nanotube structures formed from single or few wall nanotubes. For examples, structures formed from multiwall carbon nanotubes are generally observed to have greater emissivity than those formed from few/single wall carbon nanotubes. While not wishing to be bound by theory, it is believed that the greater number of walls and greater diameter of multiwall carbon nanotubes are factors in the increased emissivity. For example, multiwall carbon nanotube structures (e.g., the nanotube forest, a nanotube sheet) have a greater thermal emissivity than nanotube structures formed from few/single wall nanotubes. In one comparative example, an emissivity of a nanofiber structure comprising multiwall carbon nanotubes is on the order of 0.275 (+/−15%) whereas a nanofiber structure comprising single wall carbon nanotubes can have a significantly lower emissivity of 0.05 (+/−15%). High emissivity can be particularly advantageous in technological applications in which processes can cause heating within the nanofiber structure, but mechanisms of conductive or convective cooling of the nanofiber structure are limited or not technically feasible.

For example, nanofiber structures having transparency to certain wavelengths of radiation (e.g., extreme ultraviolet or "EUV" in the range of 10 nm to 124 nm) have promise for use as a filter (also referred to as a "pellicle") in EUV lithography devices. The pellicle can act as a particle filter that prevents foreign particles from landing on a surface of the material being patterned and/or from landing on a surface of the lithography mask being used to pattern a photoactive surface. This reduces the rate of lithographically introduced defects, thus improving manufacturing yields of the patterned devices.

Despite the high transparency in the EUV radiation wavelength range, challenges remain to adopting nanofiber EUV pellicles. For example, cooling a nanofiber pellicle may be important for preventing overheating of the pellicle due to absorption of EUV energy during lithographic patterning. Elevated temperatures in the pellicle can degrade nanofiber structure integrity. However, the opportunities for convective and or conductive cooling of the nanofiber structure in this environment are low given that EUV lithography is performed in a vacuum and the pellicle is mostly suspended (with peripheral edges being attached to a frame). For this reason, thermal emission is the primary mechanism of cooling of a nanofiber pellicle used for EUV application.

While multiwall carbon nanotube structures generally have a higher emissivity, which would address the problem of cooling in EUV pellicle, multiwall carbon nanotubes when aligned in a drawn sheet also are less transmissive than randomly oriented single/few wall carbon nanofibers in a filtered film. The more transparent (but less emissive) few wall/single wall nanofiber films are often too mechanically delicate to be used as a pellicle. In some cases, because of their relative short lengths (e.g., less than 100 μm), films and sheets made from few wall/single wall nanofibers are fragile and will disintegrate when subjected to pressure cycles (e.g., changes in pressure of +/−1 atmosphere to 2 atmospheres (from atmospheric pressure to vacuum)) commonly used in EUV lithography machines.

Thus, in accordance with some examples of the present disclosure, multilayer carbon nanofiber structures (e.g., multilayer structures comprising multiple stacked films and/or sheets) are described that are composites of multiwall carbon nanotubes and one or more of single wall and/or few walled carbon nanotubes. By selecting the relative proportions of multiwall nanotubes and one or more of single/few wall carbon nanotubes in a nanofiber membrane, an extreme ultraviolet radiation filter (sometimes also referred to as a "pellicle") can be fabricated that can have a high enough emissivity so as to withstand the heating that can occur in an EUV lithography machine during operation, while also withstanding pressure changes of between 1 atmosphere (atm) and 2 atm between operating cycles of an EUV lithography machine. In some cases, including 50 weight % to 80 weight % multiwall carbon nanotubes in a mixture that also includes single/few wall carbon nanotubes can improve the structural durability of films and membranes.

Prior to a description of example membranes, a description of nanofiber forests and sheets follows.

Nanofiber Forests

As used herein, the term "nanofiber" means a fiber having a diameter less than 1 μm. While the embodiments herein are primarily described as fabricated from carbon nanotubes, it will be appreciated that other carbon allotropes, whether graphene, micron or nano-scale graphite fibers and/or plates, and even other compositions of nano-scale fibers such as boron nitride may be densified using the techniques described below. As used herein, the terms "nanofiber" and "nanotube" are used interchangeably and encompass both single wall carbon nanotubes, few wall carbon nanotubes and/or multiwall carbon nanotubes in which carbon atoms are linked together to form a cylindrical structure. In some embodiments, multiwall carbon nanotubes as referenced herein have between 6 and 20 walls. As used herein, a "nanofiber sheet" or simply "sheet" refers to a sheet of nanofibers aligned via a drawing process (as described in PCT Publication No. WO 2007/015710, and incorporated by reference herein in its entirety) so that a longitudinal axis of a nanofiber of the sheet is parallel to a major surface of the sheet, rather than perpendicular to the major surface of the sheet (i.e., in the as-deposited form of the sheet, often referred to as a "forest"). This is illustrated and shown in FIGS. 3 and 4, respectively.

The dimensions of carbon nanotubes can vary greatly depending on production methods used. For example, the diameter of a carbon nanotube may be from 0.4 nm to 100 nm and its length may range from 10 μm to greater than 55.5 cm. Carbon nanotubes are also capable of having very high aspect ratios (ratio of length to diameter) with some as high as 132,000,000:1 or more. Given the wide range of dimensional possibilities, the properties of carbon nanotubes are highly adjustable, or "tunable." While many intriguing properties of carbon nanotubes have been identified, harnessing the properties of carbon nanotubes in practical applications requires scalable and controllable production methods that allow the features of the carbon nanotubes to be maintained or enhanced.

Due to their unique structure, carbon nanotubes possess particular mechanical, electrical, chemical, thermal and optical properties that make them well-suited for certain applications. In particular, carbon nanotubes exhibit superior electrical conductivity, high mechanical strength, good thermal stability and are also hydrophobic. In addition to these properties, carbon nanotubes may also exhibit useful optical properties. For example, carbon nanotubes may be used in light-emitting diodes (LEDs) and photo-detectors to emit or detect light at narrowly selected wavelengths. Carbon nanotubes may also prove useful for photon transport and/or phonon transport.

In accordance with various embodiments of the subject disclosure, nanofibers (including but not limited to carbon nanotubes) can be arranged in various configurations, including in a configuration referred to herein as a "forest." As used herein, a "forest" of nanofibers or carbon nanotubes refers to an array of nanofibers having approximately equivalent dimensions that are arranged substantially parallel to one another on a substrate. FIG. 1 shows an example forest of nanofibers on a substrate. The substrate may be any shape but in some embodiments the substrate has a planar surface on which the forest is assembled. As can be seen in FIG. 1, the nanofibers in the forest may be approximately equal in height and/or diameter.

Nanofiber forests as disclosed herein may be relatively dense. Specifically, the disclosed nanofiber forests may have a density of at least 1 billion nanofibers/cm². In some specific embodiments, a nanofiber forest as described herein may have a density of between 10 billion/cm² and 30 billion/cm². In other examples, the nanofiber forest as described herein may have a density in the range of 90 billion nanofibers/cm². The forest may include areas of high density or low density and specific areas may be void of nanofibers. The nanofibers within a forest may also exhibit inter-fiber connectivity. For example, neighboring nanofibers within a nanofiber forest may be attracted to one another by van der Waals forces. Regardless, a density of nanofibers within a forest can be increased by applying techniques described herein.

Methods of fabricating a nanofiber forest are described in, for example, PCT No. WO2007/015710, which is incorporated herein by reference in its entirety.

Figure 2:
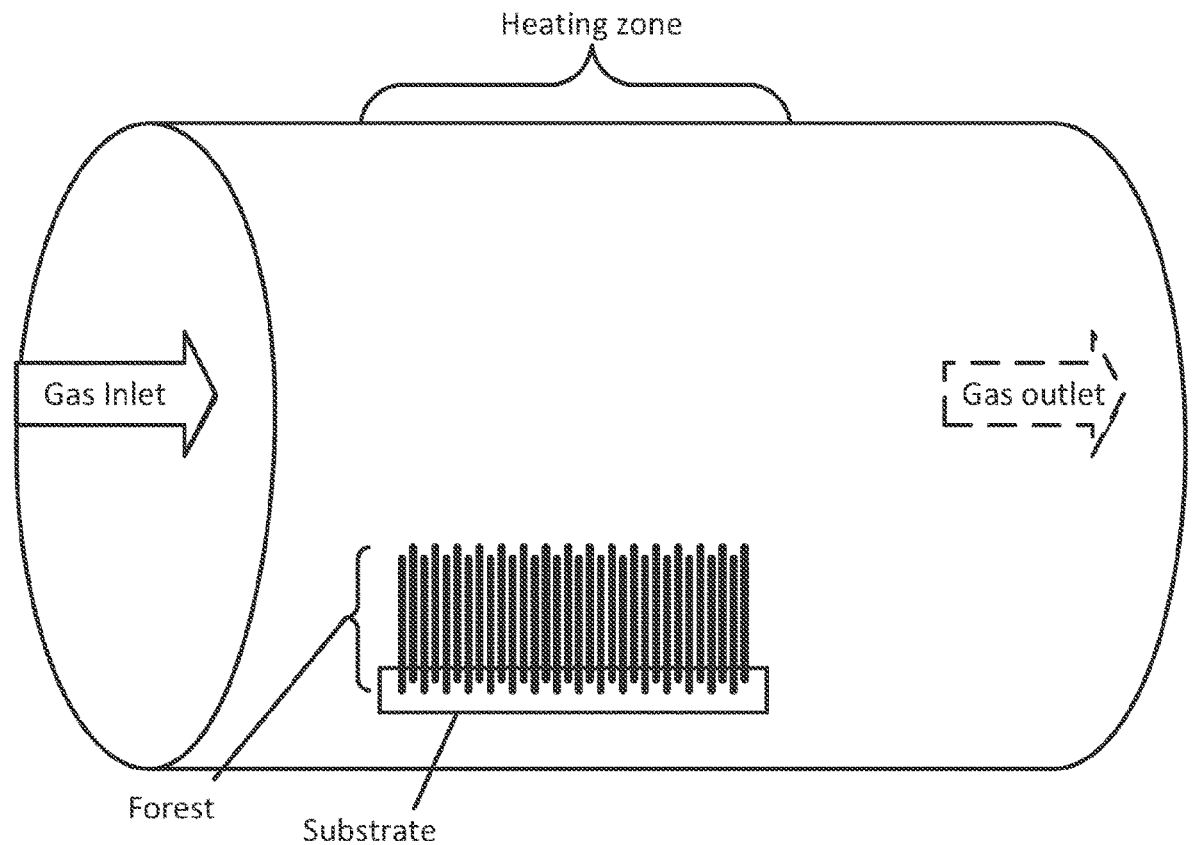
FIG. 2 is a schematic illustration of an example reactor for nanofiber growth, in an embodiment.

Various methods can be used to produce nanofiber precursor forests. For example, in some embodiments nanofibers may be grown in a high-temperature furnace, schematically illustrated in FIG. 2. In some embodiments, catalyst may be deposited on a substrate, placed in a reactor and then may be exposed to a fuel compound that is supplied to the reactor. Substrates can withstand temperatures of greater than 800° C. or even 1000° C. and may be inert materials. The substrate may comprise stainless steel or aluminum disposed on an underlying silicon (Si) wafer, although other ceramic substrates may be used in place of the Si wafer (e.g., alumina, zirconia, $SiO_2$, glass ceramics). In examples where the nanofibers of the precursor forest are carbon nanotubes, carbon-based compounds, such as acetylene may be used as fuel compounds. After being introduced to the reactor, the fuel compound(s) may then begin to accumulate on the catalyst and may assemble by growing upward from the substrate to form a forest of nanofibers. The reactor also may include a gas inlet where fuel compound(s) and carrier gasses may be supplied to the reactor and a gas outlet where expended fuel compounds and carrier gases may be released from the reactor. Examples of carrier gases include hydrogen, argon, and helium. These gases, in particular hydrogen, may also be introduced to the reactor to facilitate growth of the nanofiber forest. Additionally, dopants to be incorporated in the nanofibers may be added to the gas stream.

In a process used to fabricate a multilayered nanofiber forest, one nanofiber forest is formed on a substrate followed by the growth of a second nanofiber forest in contact with the first nanofiber forest. Multi-layered nanofiber forests can be formed by numerous suitable methods, such as by forming a first nanofiber forest on the substrate, depositing catalyst on the first nanofiber forest and then introducing additional fuel compound to the reactor to encourage growth of a second nanofiber forest from the catalyst positioned on the first nanofiber forest. Depending on the growth methodology applied, the type of catalyst, and the location of the catalyst, the second nanofiber layer may either grow on top of the first nanofiber layer or, after refreshing the catalyst, for example with hydrogen gas, grow directly on the substrate thus growing under the first nanofiber layer. Regardless, the second nanofiber forest can be aligned approximately end-to-end with the nanofibers of the first nanofiber forest although there is a readily detectable interface between the first and second forest. Multi-layered nanofiber forests may include any number of forests. For example, a multi-layered precursor forest may include two, three, four, five or more forests.

Nanofiber Sheets

Figure 3:
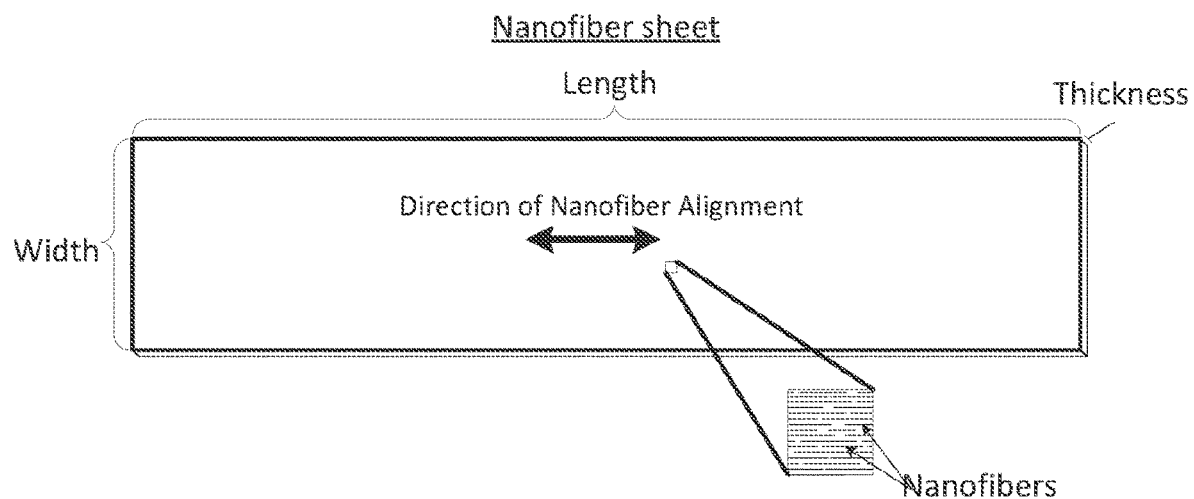
FIG. 3 is an illustration of a nanofiber sheet that identifies relative dimensions of the sheet and schematically illustrates nanofibers within the sheet aligned end-to-end in a plane parallel to a surface of the sheet, in an embodiment.

In addition to arrangement in a forest configuration, the nanofibers of the subject application may also be arranged in a sheet configuration. As used herein, the term "nanofiber sheet," "nanotube sheet," or simply "sheet" refers to an arrangement of nanofibers where the nanofibers are aligned end to end in a plane. An illustration of an example nanofiber sheet is shown in FIG. 3 with labels of the dimensions. In some embodiments, the sheet has a length and/or width that is more than 100 times greater than the thickness of the sheet. In some embodiments, the length, width or both, are more than $10^3$, $10^6$ or $10^9$ times greater than the average thickness of the sheet. A nanofiber sheet can have a thickness of, for example, between approximately 5 nm and 30 µm and any length and width that are suitable for the intended application. In some embodiments, a nanofiber sheet may have a length of between 1 cm and 10 meters and a width between 1 cm and 1 meter. These lengths are provided merely for illustration. The length and width of a nanofiber sheet are constrained by the configuration of the manufacturing equipment and not by the physical or chemical properties of any of the nanotubes, forest, or nanofiber sheet. For example, continuous processes can produce sheets of any length. These sheets can be wound onto a roll as they are produced.

As can be seen in FIG. 3, the axis in which the nanofibers are aligned end-to end is referred to as the direction of nanofiber alignment. In some embodiments, the direction of nanofiber alignment may be continuous throughout an entire nanofiber sheet. Nanofibers are not necessarily perfectly parallel to each other and it is understood that the direction of nanofiber alignment is an average or general measure of the direction of alignment of the nanofibers.

Nanofiber sheets may be assembled using any type of suitable process capable of producing the sheet. In some example embodiments, nanofiber sheets may be drawn from a nanofiber forest. An example of a nanofiber sheet being drawn from a nanofiber forest is shown in FIG. 4

Figure 4:
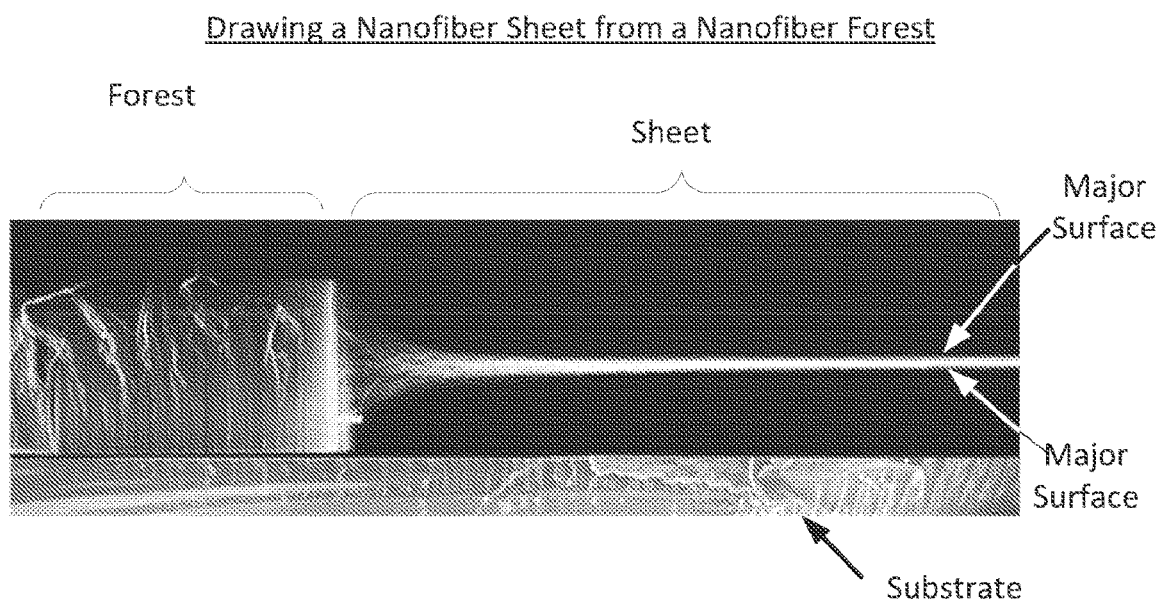
FIG. 4 is an SEM photomicrograph is an image of a nanofiber sheet being laterally drawn from a nanofiber forest, the nanofibers aligning from end-to-end as schematically, in an embodiment.

As can be seen in FIG. 4, the nanofibers may be drawn laterally from the forest and then align end-to-end to form a nanofiber sheet. In embodiments where a nanofiber sheet is drawn from a nanofiber forest, the dimensions of the forest may be controlled to form a nanofiber sheet having particular dimensions. For example, the width of the nanofiber sheet may be approximately equal to the width of the nanofiber forest from which the sheet was drawn. Additionally, the length of the sheet can be controlled, for example, by concluding the draw process when the desired sheet length has been achieved.

Nanofiber sheets have many properties that can be exploited for various applications. For example, nanofiber sheets may have tunable opacity, high mechanical strength and flexibility, thermal and electrical conductivity, and may also exhibit hydrophobicity. Given the high degree of alignment of the nanofibers within a sheet, a nanofiber sheet may be extremely thin. In some examples, a nanofiber sheet is on the order of approximately 10 nm thick (as measured within normal measurement tolerances), rendering it nearly two-dimensional. In other examples, the thickness of a nanofiber sheet can be as high as 200 nm or 300 nm. As such, nanofiber sheets may add minimal additional thickness to a component.

As with nanofiber forests, the nanofibers in a nanofibers sheet may be functionalized by a treatment agent by adding chemical groups or elements to a surface of the nanofibers of the sheet and that provide a different chemical activity than the nanofibers alone. Functionalization of a nanofiber sheet can be performed on previously functionalized nanofibers or can be performed on previously unfunctionalized nanofibers. Functionalization can be performed using any of the techniques described herein including, but not limited to CVD, and various doping techniques.

Nanofiber sheets, as drawn from a nanofiber forest, may also have high purity, wherein more than 90%, more than 95% or more than 99% of the weight percent of the nanofiber sheet is attributable to nanofibers, in some instances. Similarly, the nanofiber sheet may comprise more than 90%, more than 95%, more than 99% or more than 99.9% by weight of carbon.

Nanofiber Membrane Structure and Formation Techniques

As described above, examples described herein include nanofiber films formed from a combination of multiwalled carbon nanotubes and one or both of single wall and few wall carbon nanotubes. These can be described as "composite films" due to the combination or mixture of different nanofiber types. In some examples, the relative weight proportion is a maximum of 80 weight (wt.) % multiwalled carbon nanotubes and a minimum of 20 wt. % and/or few wall nanotubes. Lengths of the multiwall led carbon nanotubes can be controlled by lengthening or shortening the growth process in the chemical vapor deposition reactor, as described above. But for examples herein, a multiwalled carbon nanotube can have a median length of approximately 300 μm (+/−10%). As will be appreciated in light of the following description, multiwalled carbon nanotubes having a length of at least 250 μm or longer can be included in a filtered film improving the mechanical stability of filtered films that also include single wall and/or few wall carbon nanotubes, which generally are shorter (e.g. from 0.5 μm to 30 μm). Films that include either the longer multiwalled nanotubes or a shorter few/single wall carbon nanotubes are generally not as durable as those that include a mixture of multiwall and few/single wall nanotubes.

Figure 5:
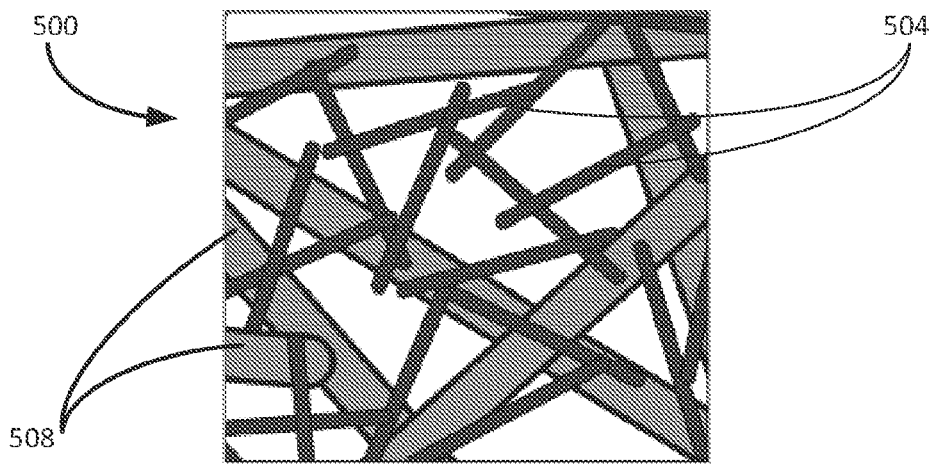
FIG. 5 is a schematic illustration of a portion of a filtered nanotube film that includes larger and longer multiwall carbon nanofibers intermixed with single wall and/or few wall carbon nanotubes, all of which are randomly oriented within a plane of the film, in an embodiment.

FIG. 5 is a schematic illustration of a composite nanotube filtered film 500, in an example of the present disclosure. As shown, the composite nanotube filtered film 500 includes single/few wall nanotubes 504 that are inter-dispersed with multiwall carbon nanotubes 508. In this example film 500, the single/few wall carbon nanotubes 504 can have at least two beneficial effects on the structure of the film 500 as a whole. For example, the single/few wall carbon nanotubes 504 can increase the number of indirect connections between proximate multiwalled carbon nanotubes 508 by bridging the gaps between them. Interconnections between the short and long nanofibers can improve the transfer and distribution of forces applied to the film and thus improve durability. These interconnections and also improve heat transmission between the nanofibers. In another example of a beneficial effect, the single/few wall carbon nanotubes 504 can decrease a median or mean size of the gaps between adjacent and/or overlapping multiwall carbon nanotubes 508. Furthermore, too many longer multiwalled carbon nanotubes can, when dispersed in a solvent, agglomerate. This can result in a non-uniform film. Shorter nanotubes are more easily dispersed in a solvent and thus are more likely to form a dimensionally uniform film having a uniform density of nanotubes per unit volume.

Figure 6:
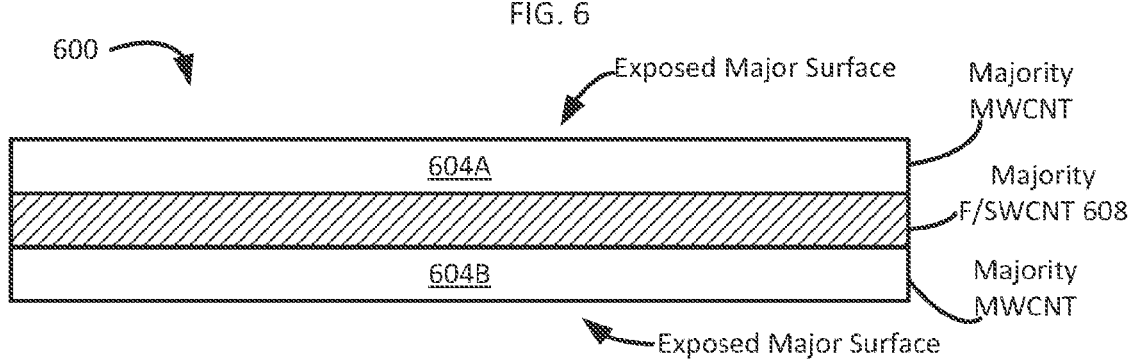
FIG. 6 is a cross-sectional side view of an example nanofiber membrane of the present disclosure, the cross-section taken perpendicular to major surfaces of the membrane, in an embodiment.

FIG. 6 is a cross-sectional illustration of one example of a composite nanofiber membrane 600, in an example of the present disclosure. As can be seen, the composite nanofiber membrane 600 can be composite not only in terms of multiple different types of nanofibers within individual layers but also a composite of multiple layers, each of which includes different ratios of the different types of nanofibers. As will be presented below in the experimental results section, it will be appreciated that tailoring the composition of each layer individually in a multilayer structure and further tailoring the number and order of layers can affect the emissivity and mechanical durability of embodiments of the present disclosure.

The composite nanofiber membrane 600 shown in FIG. 6 includes first and second layers 604A, 604B that are on opposing sides of third layer 608. The weight composition of first and second layers 604A, 604B comprises a majority (e.g., from 50 wt. % to 80 wt. %) of multiwall carbon nanotubes (i.e., nanotubes having from 4 to 20 walls). The composition of the third layer 608 is that of a majority (e.g., greater than 50 weight percent) of few wall (e.g., nanotubes having from 2 to 3 walls) and/or single wall carbon nanotubes. The ratio of multiwall carbon nanotubes to few and single wall carbon nanotubes is greater in the third layer than it is in either or both of layers 604A and 604B.

The composite nanofiber membrane 600 can be formed in any of a variety of ways. The desired proportions of different walled nanotubes can be compounded on a dry basis or wet basis. For example, each layer can be made from a dry mixture of the desired proportion of multiwalled carbon nanotubes and few/single walled carbon nanotubes can be mixed and then suspended in a solvent. In another example, separate suspensions of known concentrations are prepared of multiwalled carbon nanotubes and one or more of few wall carbon nanotubes and/or single wall nanotubes. The suspensions can then be mixed in proportions to arrive at the desired relative weights of the multiwall, and few/single wall nanotubes in the final filtered film.

When preparing the one or more suspensions, dry carbon nanotubes can be mixed with the solvent to uniformly distribute the nanotubes in the solvent as a suspension. Mixing can include mechanical mixing (e.g., using a magnetic stir bar and stirring plate), ultrasonic agitation (e.g., using an immersion ultrasonic probe) or other means. In some examples the solvent can be a protic or aprotic polar solvent such as water, isopropyl alcohol (IPA), N-Methyl-2-pyrrolidone (NMP), dimethyl sulfide (DMS), and combinations thereof. In some examples a surfactant can also be included to aid the uniform dispersion of carbon nanofibers in the solvent. Example surfactants include, but are not limited to, sodium cholate, sodium dodecyl sulfate (SDS), and sodium dodecyl benzene sulphonate (SDBS). Weight percentage of surfactant in the solvent can be anywhere between 0.1 weight % to 10 wt. % of solvent. In one embodiment, a mixture of 50 wt % multiwalled carbon nanotubes and 50 wt % few/single wall carbon nanotubes can be prepared and suspended in water and SDS surfactant.

The concentration of nanotubes in a suspension can vary depending on the type of nanotube and the desired properties of the resulting membrane. In different embodiments, nanotube suspensions can be prepared at wt/wt concentrations of greater than 1%, greater than 0.1%, greater than 100 ppm, greater than 10 ppm or greater than 1 ppm. Other concentrations include, by weight, greater than 1 ppm, greater than 100 ppm, greater than 1000 ppm, greater than 1% or greater than 5%. Specific ranges include 0.1 to 100 ppm, 1 to 100 ppm, 1 to 1000 ppm and 10 to 10,000 ppm. Suspensions may be developed from masterbatches that contain high levels of carbon nanotubes. For example, a masterbatch may include, by weight, greater than or equal to 0.1%, 1%, 2% or 3% wt/v nanotubes in solvent. More dilute suspensions may have greater stability and in some cases, suspensions of, for example, 100 ppm or less can remain stable for more than 1 minute, more than 1 hour or more than 5 hours. Dilute suspensions may be produced from masterbatches using the same or different solvent from that used for the masterbatch.

The solution can then be introduced into a structure that removes the solvent and causes the formation of a film of randomly oriented nanofibers on a substrate. Examples of this process include, but are not limited to, vacuum filtration onto a porous substrate such as filter paper. Because this composite "filtered film" of nanotubes is hydrophobic, the filtered film can be separated from the filter paper (or other substrate) by immersing the substrate and film into water, thus causing the composite film to float on the surface of water. In some cases, a hydrophilic filter paper may be used to provide for easier separation of the film. The membrane can be separated from the filter paper by running water between the filter and the film. Because the film is hydrophobic and the filter paper is hydrophilic, water running between the two can gently lift the film off of the substrate without tearing or deformation. A frame can then be used to lift the film from the surface of the water, thus depositing the filtered film on the frame. If needed, the surface tension of the water (or other solvent) can be modified by adding surfactants or other solvents. The film can then be dried (e.g., using a low humidity environment, heat, vacuum). This process can be repeated to form different films of, optionally, differently composed mixtures of multiwall, few wall, and/or single wall nanotubes.

It can be important that all areas of the substrate are subjected to equal fluid flow. In some cases, baffles can be employed across the diameter of the filter to help promote uniform flow and/or prevent fluid vortexing or rotation. While a baffle can be placed above the substrate, it should not come in contact with the substrate so that it does not come into contact with the nanotube film. In some cases, the baffle may be placed greater than 1 mm above the surface of the substrate.

Films and membranes can be formed so that the thickness of the film is uniform or non-uniform. For example, the thickness of a uniform film may vary by less than 50%, less than 20% or less than 10% across the film. In other cases, non-uniform films can be desirable to provide different features to different parts of the film. For instance, a strong border of the membrane can be achieved by increasing the concentration of carbon nanotubes around the edge of the film. Areas of increased concentration of carbon nanotubes have a greater areal density (wt of nanotubes per area) than do areas of reduced concentration of carbon nanotubes. Different portions of a film may have carbon nanotube areal densities that differ by more than 10%, more than 20% or more than 50%. Carbon nanotube areal density ratios of these regions can be greater than 1.1, 1.2, 1.5, 2.0 or 3.0. A film may contain two, three, four or more areas of differing areal densities.

The areal density of carbon nanotubes on the membrane edge can be increased by increasing the flow of suspended nanotubes through the edge portion of the membrane. This can be achieved, for example, by passing greater volumes of fluid through the membrane edge than through other portions of the membrane and can be accomplished by increasing the flow rate through the membrane edge when compared to other areas of the membrane. An increased concentration along the membrane edge can also be achieved by passing carbon nanotube suspension through the edge portions of the substrate without passing the suspension through other portions of the substrate. For example, four different containers containing different amounts of nanotubes can be poured onto the edges of the membrane while fluid is being flowed through the underlying substrate. Increased flow through different sections of the film, such as the edges, can be performed by varying the resistance to flow at various points on the substrate (e.g., filter paper) that the film is deposited on. For instance, the edge portion of the filter paper may be one layer of filter paper thick, while non-edge portions of the filter are two or three layers of filter paper thick. This will divert a greater flow of material through the one layer of filter paper than through the multiple layers, resulting in a greater amount of nanotube deposition in the area that includes only a single layer of filter paper. The additional filter paper layers can be on top, on the bottom (e.g., with an adhesive) or sandwiched in between two layers of filter paper that extend to the edges. For instance, for a square 10×10 cm membrane, a 5 mm edge border of greater thickness can be made my placing a 9×9 cm filter paper on or under a 10×10 cm piece of filter paper and passing the liquid portion of the suspension through both filter papers using the same pressure gradient.

In other cases, the flow through different portions of the substrate (filter paper) can be increased or decreased at different times during the film formation process. For example, membrane formation can start with consistent flow through the entire exposed surface, and when a certain areal density of nanotubes is achieved a stencil can be contacted with the lower side of the filter paper to prevent flow through the filter paper where it is in contact with the stencil. Flow will continue through areas that avoid the stencil, and nanotube membrane formation will continue in those regions, resulting in areas of greater nanotube density and thickness. Stencil shapes can vary and may match the general shape of the porous substrate but have a smaller diameter to allow formation of a high density border region at the edges.

Figure 11:
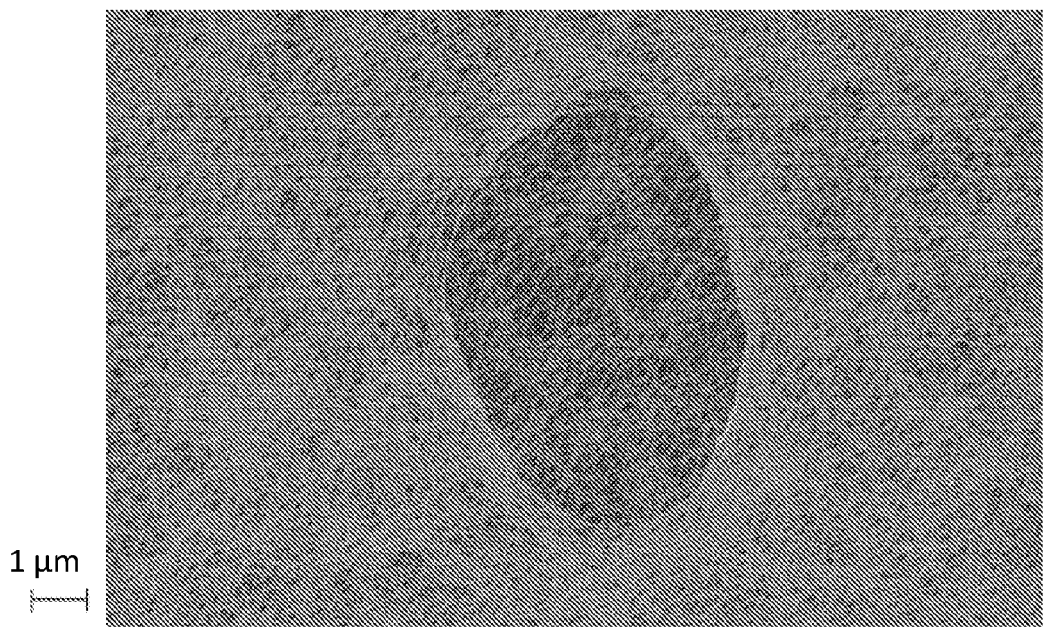
FIG. 11 illustrates a fabrication defect covered by a second nanofiber membrane layer, in an embodiment.

This example process can be repeated multiple times to produce multiple films of carbon nanotubes. In some examples, individual films (having the same or different proportions of multiwall and few/single walled carbon nanotubes in each film) are stacked on one another to form a multilayer composite film. Stacking two or more films can produce a more uniform stack with more uniform properties. For example, if one film in the stack has a local defect (e.g., a hole or tear, such as that shown in FIG. 11), adjacent films in the stack can provide physical continuity and uniformity of the properties that would otherwise be absent at the location of the defect. Multilayer nanofiber membranes, like that shown in FIG. 11, offer a solution to defects such as holes that might occur during film formation. In some embodiments, a stack can include anywhere from 2 to 10 individual films, each of which can have a same or different composition (that is, for example, a different relative proportion of multiwall to single/few wall carbon nanotubes) from other films in the stack.

In some examples, a stacked film can be exposed to a densifying solvent that includes, for example, water, IPA, NMP, Dimethylformamide (DMF), toluene, or combinations thereof. Exposure to a densifying solvent can cause the films in a stack to adhere to one another. In some cases, not only do the films in the stack adhere to one another, but they merge so as to become indistinguishable from one another, even when using microscopy techniques to examine a cross-section of the stack. In other words, the densified stack does not have visible or microscopically detectable interfaces between layers and has become a single uniform layer.

As shown in FIG. 6, first and second layers 604A, 604B are on the exposed surfaces of the membrane 600. As described above, the first and second layers 604A, 604B are composed of a majority (e.g., between 50 wt. % and 80 wt. %) multiwall carbon nanotubes. As also described above, films formed from multiwall carbon nanotubes have a higher thermal emissivity than those formed from few/single wall nanotubes. Thus configured, the exposed first and second layer 604A, 604B can improve the reliability of the membrane 600 when used in an environment that includes EUV and/or a vacuum. By emitting thermal energy (formed in the membrane by the incident radiation) more efficiently than a membrane composed primarily of few/single wall nanotubes, the membrane 600 can better withstand the operating environment in an EUV lithography device. This configuration further reduces the reabsorption of thermal radiation emitted by and/or conducted away from the membrane 600.

Figure 7:
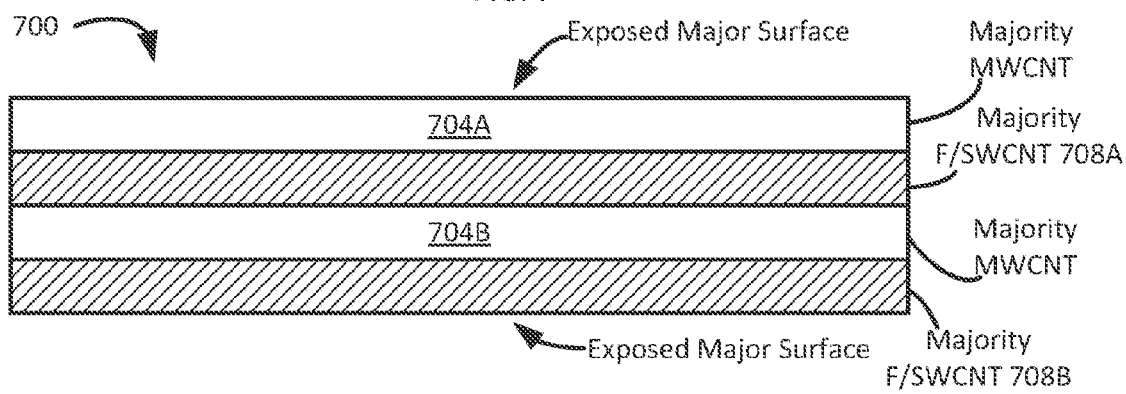
FIG. 7 is a cross-sectional side view of an example nanofiber membrane of the present disclosure, the cross-section taken perpendicular to major surfaces of the membrane, in an embodiment.

FIG. 7 illustrates an alternative embodiment of a composite nanofiber membrane 700 formed from a stack of filtered carbon nanotube films. Similar to the membrane 600, the membrane 700 includes first and second layers 704A, 704B that are formed primarily from multiwall carbon nanotubes. Third and fourth layers 708A, 708B are formed primarily from single/few wall carbon nanotubes.

Figure 8:
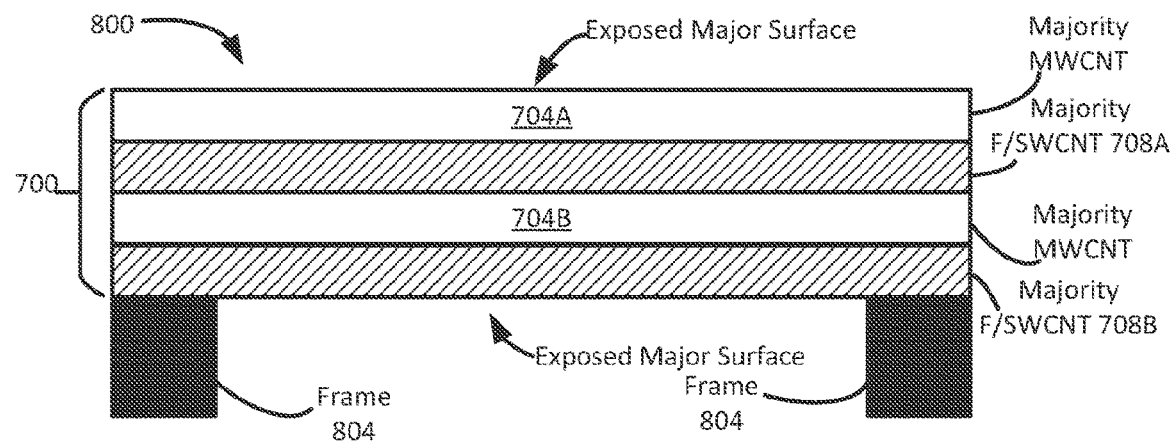
FIG. 8 illustrates the nanofiber membrane of FIG. 7 on a frame, in an embodiment.

FIG. 8 illustrates an assembly 800 that includes a membrane frame 804 on which is disposed an example carbon nanotube membrane (in the example shown, membrane 700). It will be appreciated that any membrane within the scope of the disclosure can be placed on a frame 804. Membrane 700 is depicted in FIG. 8 as only one example embodiment. In some examples, the frame 804 can be fabricated from polymers such as polyethylene, polycarbonate, composite materials such as carbon fiber epoxy composites, and metals such as aluminum and stainless steel. In some examples, the frame 804 is dimensioned and configured to fit within an EUV lithography machine so that lithographically defined features can be exposed onto an underlying photo active surface. in some examples the frame 804 is dimensioned and configured for convenient transportation from a membrane manufacturing site to an EUV lithography site. In this example, the frame 804 is configured primarily to hold a freestanding carbon nanotube, as described herein, and conveniently release the freestanding membrane for subsequent placement on a different frame that is configured for insertion into the EUV lithography machine. In some examples, having separate transportation and lithography frames enables the transportation frame to be fabricated according to design criteria that are easier to meet and with materials that are less expensive than those typically used when fabricating components of an EUV lithography machine. Furthermore, frames configured specifically for the EUV lithography machine, which are likely to be more expensive, can be maintained solely within the lithography manufacturing location (e.g., a cleanroom), reducing the rate of wear, breakage, and/or contamination.

Figure 9:
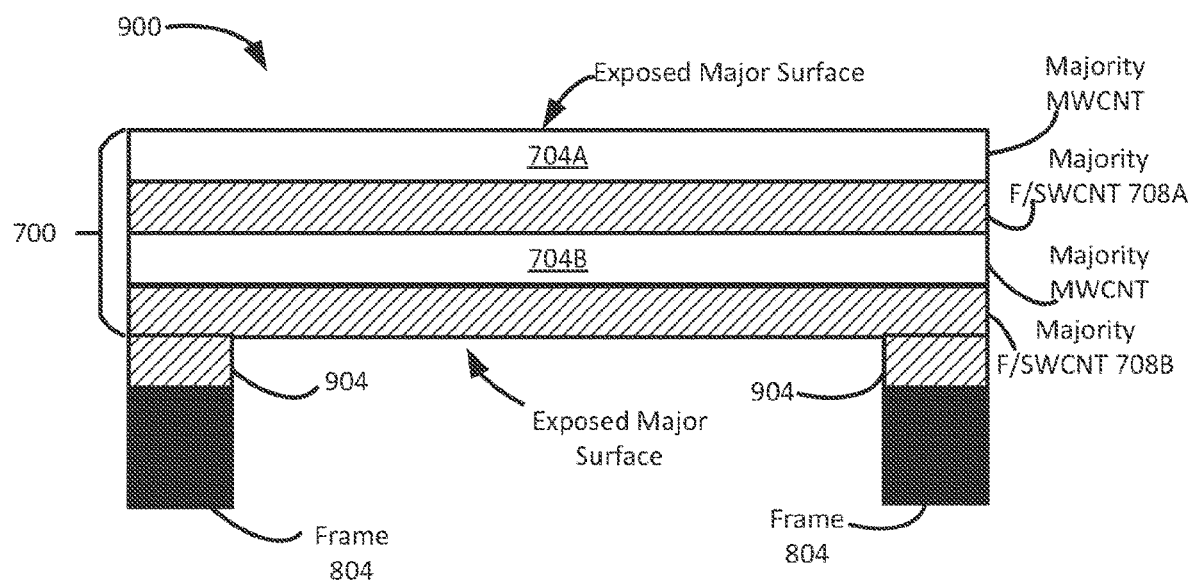
FIG. 9 illustrates the nanofiber membrane of FIG. 7 that includes an intervening nanofiber adhesion layer between the membrane and the frame, in an embodiment.

FIG. 9 illustrates an alternative embodiment assembly 900 that includes the elements previously described, and an adhesion layer 904 disposed between the frame 804 and the nanofiber membrane 700. Even though carbon nanotubes in the membrane 700 will adhere to the frame 804 (whether made of a polymer or a metal or a composite) generally carbon nanotube adhesion is strongest with other carbon nanotubes. This can be particularly the case for carbon nanotubes having a smaller diameter, namely single wall and/or few wall carbon nanotubes. To combine the benefits of the frame 804 with the strong nanofiber to nanofiber adhesion, an adhesion layer 904 of carbon nanotubes can be deposited directly on the frame 804 prior to placing the membrane 700 on the frame.

The adhesion layer 904 can be produced by first preparing a suspension of carbon nanotubes and forming a "filtered film" as described above. The filtered film can be configured to match the exposed area of the frame 804 that will ultimately be in indirect contact and adhered to membrane 700. A portion of the adhesion layer filtered film spanning structures of the frame can be removed so that none of the film spans an opening (or openings) within and/or defined by the frame 804. Techniques to remove excess film from areas that are not directly overlying the frame 804 include using a laser, electrical discharge machine (EDM), mechanical techniques (cutting with the blade such as a surgical blade or a fracture surface of a silicon wafer). In some techniques, a solvent can be mechanically applied using an applicator such as a thin bar. For example acetone, IPA, NMP, DMF, toluene or other solvents (and combinations thereof) can be applied to a bar which is then passed through the film to excise the desired portion of the filtered film.

In some examples, a bottom layer of the membrane can be formulated so as to include a greater percentage (e.g., greater than 50%, greater than 60%, greater than 70% by weight) of few wall and/or single wall carbon nanotubes to further improve adhesion when in direct contact with the adhesion layer 904.

In some examples, a coating may be conformally deposited onto exposed surfaces of the membrane. Example coatings include, but are not limited to, one or more layers of metal (e.g., tungsten, iron, or other carbide forming metal, gold, silver, boron, ruthenium, silicon nitride, among others. In some embodiments, coatings can be from 1 nm to 10 nm thick. Thicker coatings are possible but may decrease transparency to some wavelengths of radiation (depending on the properties of the coating and the wavelength of radiation). A coating may make it easier to removably adhere the structures together because a coating may reduce the van der Waals force between confronting layers. A coating applied after the various layers have been assembled and adhered to one another generally will not interfere with the transfer of heat from the single/few walled carbon nanotube filtered films (e.g., between exposed surfaces of the membrane) to the more thermally emissive drawn sheets of multiwall carbon nanofiber tubes forming the exposed surfaces of the membrane, in some examples. In some examples, a conformal layer on exposed surfaces of the nanofiber sheet can reduce degradation of the membrane caused by hydrogen ions present in the lithography exposure chamber.

In other examples, one or more major surfaces of the membrane can be formed from a nanofiber sheet of multi-walled carbon nanotubes drawn from a nanofiber forest (aligned nanotubes). Therefore, a membrane can be a composite of carbon nanotube drawn sheets (aligned nanotubes) and carbon nanotube filtered films (random nanotubes) stacked together. Experimental results corresponding to some embodiments of this configuration appear in Table 1 in sample numbers 5-11.

Experimental Results

The following table reproduces results measured from a number of samples prepared according to some embodiments of the present disclosure. Samples measured include variations of stacks of "filtered films" (e.g., films produced from nanofibers suspended in a solution as described above), with or without one or two nanofiber sheets drawn from a nanofiber forest (as described above in the context of FIGS. 3, 4). The number and type of layers are identified in the second and third columns from the left. The fourth column from the left labeled "CNT height" identifies a height of a nanofiber forest used to draw a nanofiber sheet. Thus, this column identifies a length of the multiwalled carbon nanofibers used to form the drawn sheet. The column labeled transmittance identifies the percentage of intensity of 550 nm wavelength of light transmitted through the stack of filtered films and/or drawn sheets. "Gap size" identifies an average size of gaps between bundles of nanofibers.

As can be observed, filtered films of nanotubes, as described above, with their random orientation of nanotubes within the film and their composite nature (i.e., a mixture of multiwall carbon nanotubes and one or more of single wall and few wall nanotubes) have a higher transmittance. In some examples, for membranes with two layers of filtered films, this transmittance is as high as 89% (for 550 nm wavelength radiation). Including one or more drawn sheets, with their multiwall carbon nanotubes aligned in the drawing direction, causes a drop in transmittance to between 72 and 79%. In some examples (e.g., sample numbers 3-8), the drawn sheet layers are on one or both of the major surfaces of an intervening filtered film.

TABLE 1

| Sample # | # Filtered Film Layers | # Drawn Sheet Layers | Transmittance % (550 nm) |
|---|---|---|---|
| 1 | 2 | 0 | 89% |
| 2 | 2 | 0 | 88% |
| 3 | 1 | 2 | 77% |
| 4 | 1 | 2 | 73% |
| 5 | 1 | 1 | 78% |
| 6 | 0 | 1 | 82% |
| 7 | 0 | 2 | 75% |
| 8 | 0 | 3 | 65% |

Figure 10A:
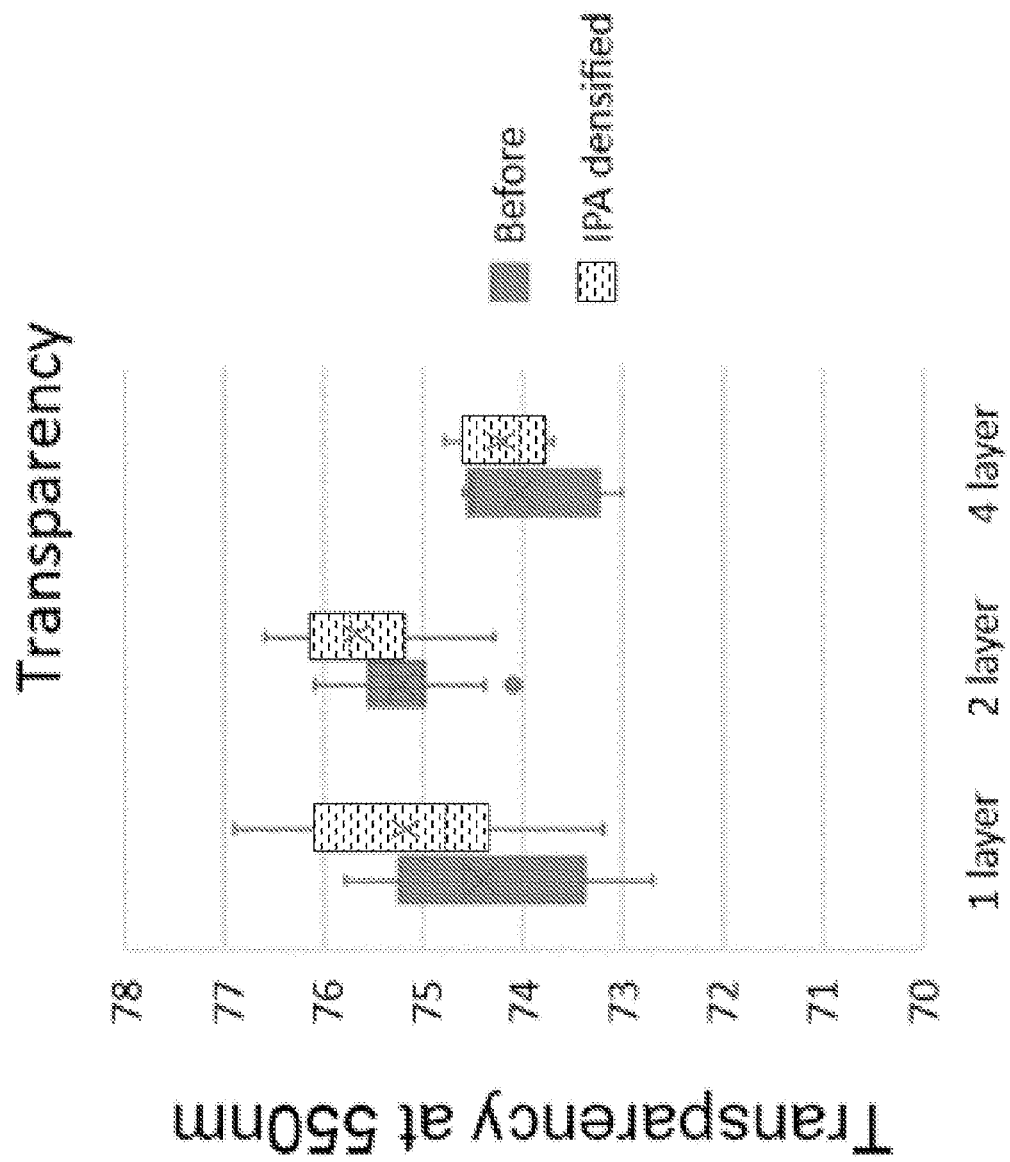
FIGS. 10A-D illustrate results of mechanical properties and gas permeability data for the case where the total areal mass is divided into several nanofiber membrane layers, in an embodiment.
Figure 10B:
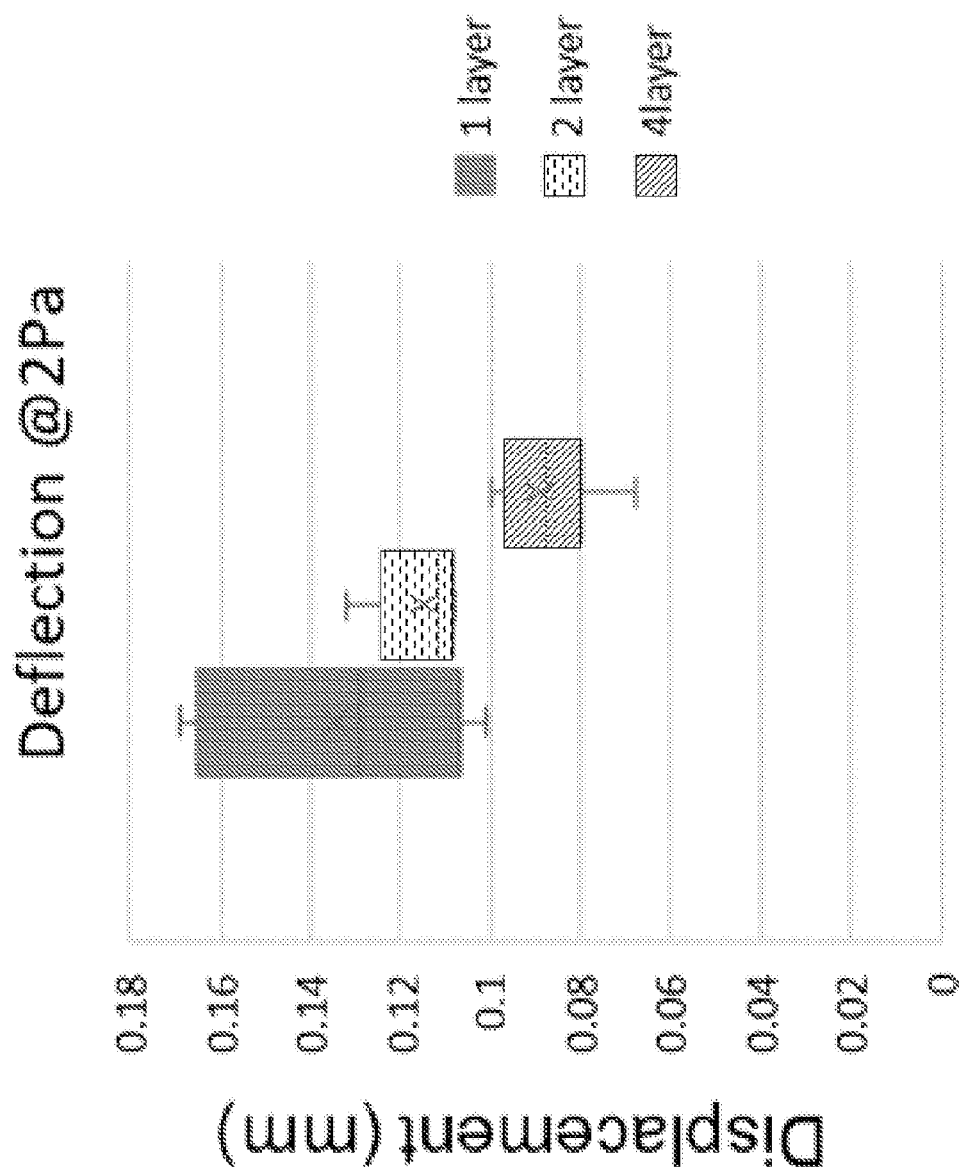
Figure 10C:
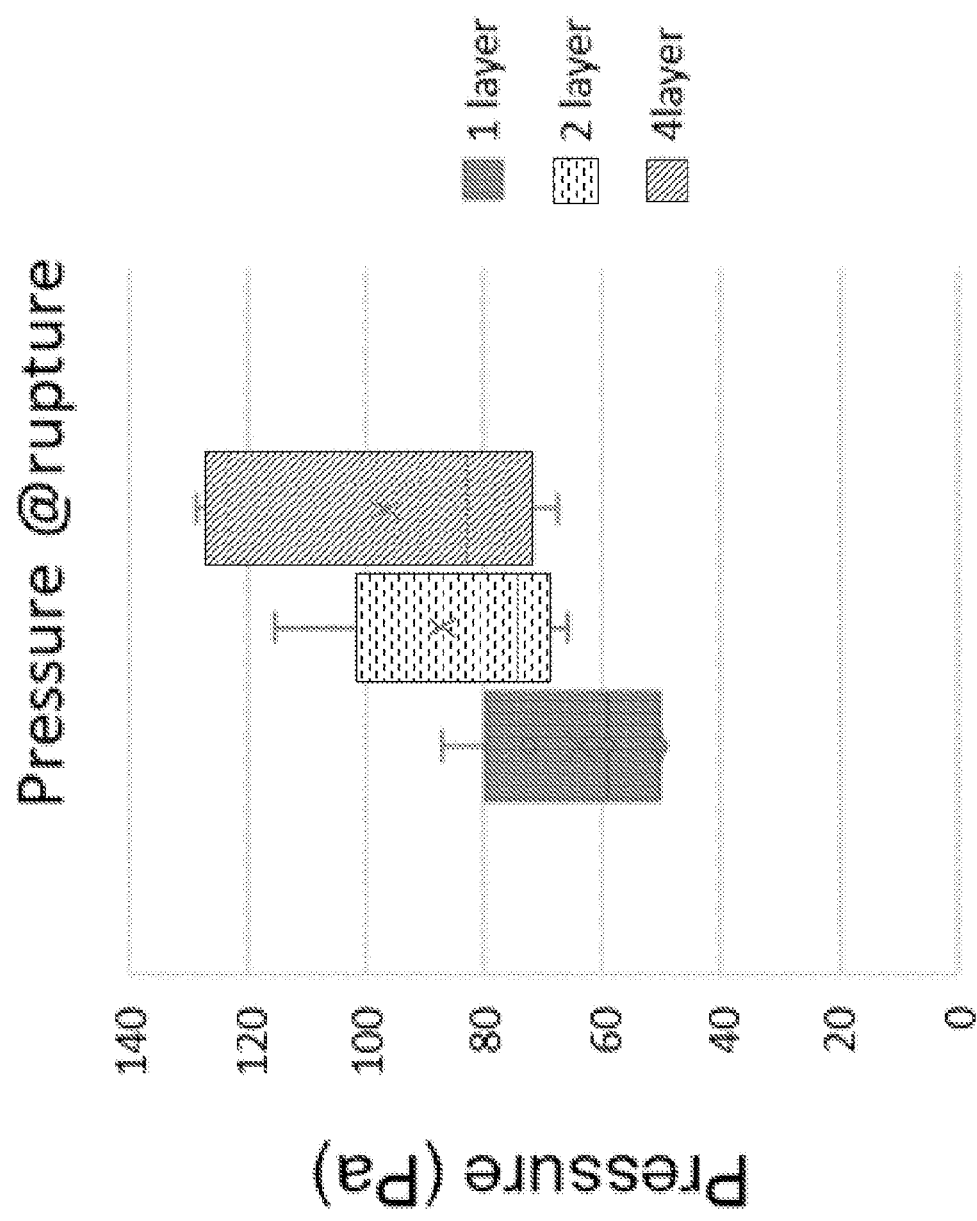
Figure 10D:
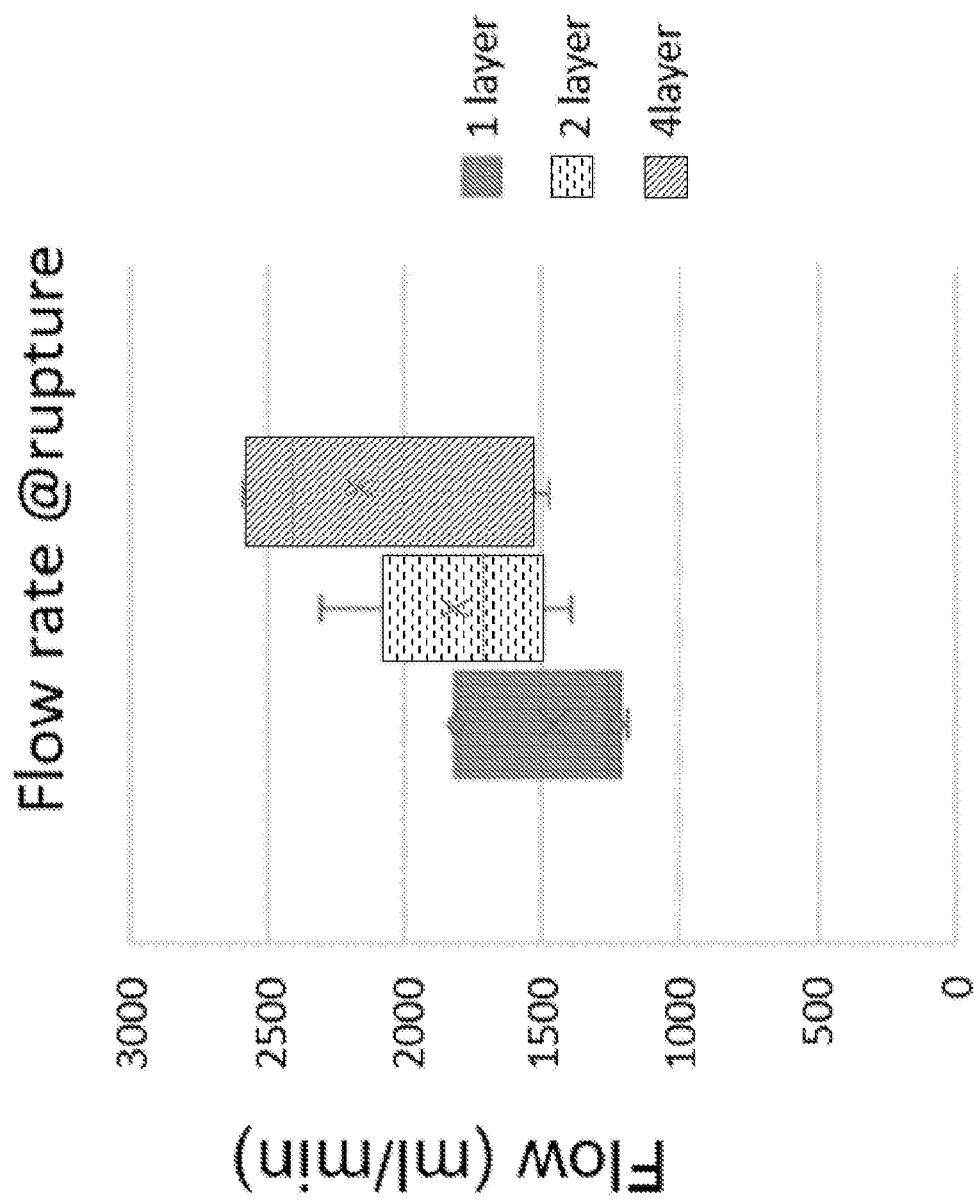

FIGS. 10A-D illustrate results of mechanical properties and gas permeability data for the case where the total areal mass is divided into several nanofiber membrane layers, in an embodiment. FIG. 10A illustrates experimental results comparing transparency before and after densification with isopropyl alcohol (IPA) for nanofiber membranes with 1 layer, 2 layers, and 4 layers. FIG. 10A shows that transparency is similar for 1 layer, 2 layers, and 4 layers. The experimental results in FIG. 10B illustrate that when the total areal mass of the nanofiber membrane is divided into several layers, while keeping total areal density and transparency similar, the result is a reduced deflection of the films under pressure. The experimental results in FIG. 10C illustrate that when the total areal mass of the nanofiber membrane is divided into several layers, while keeping total areal density and transparency similar, the result is an increased rupture pressure of the films. The experimental results in FIG. 10D illustrate that when the total areal mass of the nanofiber membrane is divided into several layers, while keeping total areal density and transparency similar, the result is an increased permeability of the films. This data is supportive of the improved functionality and desirability of the layered nanofiber membrane described herein.

FURTHER CONSIDERATIONS

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A nanofiber membrane comprising: a first layer of carbon nanofibers comprising a mixture of randomly oriented and randomly distributed multiwall carbon nanofibers, single wall carbon nanofibers, and few wall carbon nanofibers, wherein the first layer comprises: from 50 weight percent to 80 weight percent multiwall carbon nanofibers and from 20 weight percent to 50 weight percent single wall and few wall carbon nanofibers, so as to total 100 weight percent, wherein: the multiwall carbon nanofibers comprise from 4 walls to 20 walls; the few wall carbon nanofibers comprise 2 walls and/or 3 walls; and the single wall carbon nanofibers comprise 1 wall.

2. The nanofiber membrane of claim 1 further comprising: at least one second layer of carbon nanofibers, the at least one second layer of carbon nanofibers comprising 50 weight percent or more of single wall and/or few wall carbon nanofibers and 50 weight percent or less of multiwall carbon nanofibers, so as to total 100 weight percent, wherein the nanofiber membrane includes a plurality of the first layers, at least one of the plurality of the first layers forms first exposed surface of the nanofiber membrane, and a first one of the at least one second layer of carbon nanofibers is disposed directly on a surface of one of the first layers, wherein the first one of the at least one second layer of carbon nanofibers forms second exposed surface of the nanofiber membrane, the second exposed surface of the nanofiber membrane being opposite to the first exposed surface of the nanofiber membrane.

3. The nanofiber membrane of claim 1, wherein:
the multiwall carbon nanofibers comprise a cross-sectional diameter of from 6 nm to 100 nm and a length of from 250 μm to 400 μm;
the few wall carbon nanofibers comprise a cross-sectional diameter of from 2 nm to 6 nm and a length of from 0.5 μm to 30 μm; and
the single wall carbon nanofibers comprise a cross-sectional diameter of 0.2 nm to 2 nm and a length of from 0.5 μm to 30 μm.

4. The nanofiber membrane of claim 1, further comprising: at least one second layer of carbon nanofibers, the at least one second layer of carbon nanofibers comprising 50 weight percent or more of single wall and/or few wall carbon nanofibers and 50 weight percent or less of multiwall carbon nanofibers, so as to total 100 weight percent, wherein the nanofiber membrane includes a plurality of the first layers, a first one of the second layer is disposed between a first one and a second one of the plurality of the first layers, and wherein the first one and the second one of the plurality of first layers form exposed surfaces of the nanofiber membrane.

5. The nanofiber membrane of claim 1, wherein the nanofiber membrane has a thickness variation not exceeding is 50% of a highest thickness of the nanofiber membrane.

6. The nanofiber membrane of claim 1, wherein the nanofiber membrane has a thickness variation with a lower limit of 10% of a highest thickness of the nanofiber membrane.

7. The nanofiber membrane of claim 1, wherein the nanofiber membrane has a first region and a second region and the first region has a first areal density of nanofibers that is at least twice as great as a second areal density of nanofibers in the second region.

8. The nanofiber membrane of claim 7 wherein the first region is at a peripheral edge of the nanofiber membrane.

9. The nanofiber membrane of claim 1, wherein the nanofiber membrane has a greater than 85% transmittance of radiation having a wavelength of 550 nm.

10. The nanofiber membrane of claim 1, wherein the multiwall carbon nanofibers have a length ranging from 10 µm to 55.5 cm.

11. The nanofiber membrane of claim 10, wherein the few wall or the single wall carbon nanofibers have a length ranging from 0.5 µm to 55.5 cm.

12. The nanofiber membrane of claim 10, wherein the few wall or the single wall carbon nanofibers have a length ranging from 10 µm to 55.5 cm.

13. The nanofiber membrane of claim 2, wherein at least one of the at least one second layer comprises randomly oriented and randomly distributed multiwall, few wall, and single wall carbon nanofibers.

14. The nanofiber membrane of claim 1 further comprising a frame in contact with a peripheral edge of the nanofiber membrane, wherein the nanofiber membrane that is not in contact with the frame is freestanding.

15. The nanofiber membrane of claim 14 further comprising an adhesive layer between the frame and the nanofiber membrane.

16. The nanofiber membrane of claim 1, wherein
the 50 weight percent to 80 weight percent of the multiwall carbon nanofibers provide a first emissivity value, and
the 20 weight percent to 50 weight percent of the single wall and the few wall carbon nanofibers provide a second emissivity value, and
wherein the first emissivity value is greater than the second emissivity value.

17. A nanofiber membrane comprising:
a first layer of carbon nanofibers comprising a sheet of multiwall carbon nanofibers aligned in a plane of the sheet; and
a second layer of carbon nanofibers comprising a mixture of multiwall carbon nanofibers, single wall carbon nanofibers, and few wall carbon nanofibers, wherein the second layer comprises:
from 50 weight percent to 80 weight percent multiwall carbon nanofibers and from 20 weight percent to 50 weight percent single wall and few wall carbon nanofibers, so as to total 100 weight percent,
wherein:
the multiwall carbon nanofibers comprise from 4 walls to 20 walls;
the few wall carbon nanofibers comprise 2 walls and/or 3 walls; and
the single wall carbon nanofibers comprise 1 wall.

18. The nanofiber membrane of claim 17, further comprising a third layer of carbon nanofibers on a side of the second layer opposite the first layer, the third layer comprising: a layer comprising more than 50 weight percent of single wall and few wall carbon nanofibers; or a second sheet of multiwall carbon nanofiber aligned in a plane of the sheet.

19. The nanofiber membrane of claim 17, wherein
the 50 weight percent to 80 weight percent of the multiwall carbon nanofibers provide a first emissivity value, and
the 20 weight percent to 50 weight percent of the single wall and the few wall carbon nanofibers provide a second emissivity value, and
wherein the first emissivity value is greater than the second emissivity value.

* * * * *

UNITED STATES PATENT AND TRADEMARK OFFICE
CERTIFICATE OF CORRECTION

| | |
|---|---|
| PATENT NO. | : 11,820,659 B2 |
| APPLICATION NO. | : 17/605753 |
| DATED | : November 21, 2023 |
| INVENTOR(S) | : M. Lima |

It is certified that error appears in the above-identified patent and that said Letters Patent is hereby corrected as shown below:

In the Claims

Column 16, Line 34 (Claim 2) please change "forms first" to -- forms a first --
Column 16, Line 39 (Claim 2) please change "forms second" to -- forms a second --
Column 16, Lines 66-67 (Claim 5) please change "exceeding is 50%" to -- exceeding 50% --

Signed and Sealed this
Thirtieth Day of April, 2024

Katherine Kelly Vidal
*Director of the United States Patent and Trademark Office*